United States Patent [19]

Malozemoff

[11] 3,899,779

[45] Aug. 12, 1975

[54] MAGNETIC BUBBLE DOMAIN SYSTEM USING DIFFERENT TYPES OF DOMAINS

[75] Inventor: Alexis Plato Malozemoff, New York, N.Y.

[73] Assignee: International Business Machines Corporation, Armonk, N.Y.

[22] Filed: June 29, 1973

[21] Appl. No.: 375,285

[52] U.S. Cl. ...................... 340/174 TF; 340/174 SR
[51] Int. Cl.[2] .................. G11C 11/14; G11C 19/08
[58] Field of Search ................ 340/174 TF, 174 SR

[56] References Cited

UNITED STATES PATENTS

| | | | |
|---|---|---|---|
| 3,643,238 | 2/1972 | Bobeck et al. | 340/174 TF |
| 3,676,872 | 7/1972 | Lock | 340/174 TF |
| 3,689,902 | 9/1972 | Chang | 340/174 TF |
| 3,701,129 | 10/1972 | Copeland | 340/174 TF |
| 3,728,153 | 4/1973 | Heinz | 340/174 TF |
| 3,728,697 | 4/1973 | Heinz | 340/174 TF |

OTHER PUBLICATIONS

Bell System Technical Journal "Device Implications of the Theory of Cylindrical Magnetic Domains" by Thiele, Vol. 50, No. 3, Mar. 1971, pp. 725–772;

Bell System Technical Journal, "A New Type of Cylindrical Magnetic Domain" by Tabor et al., Vol. 51, No. 6, July–August 1972, pp. 1427–1430.

Bell System Technical Journal, "Suppression of Hard Bubbles in Magnetic Gormet Films by Ion Implantation" by Wolfe et al., Vol. 51, No. 6, July–August 1972, pp. 1436–1440

IBM Tech. Disc. Bull., "Extension of Operating Regions In Bubble Domain Memories" by Almasi et al., Vol. 15, No. 6, Nov. 1972, pp. 2021, 2022.

*Primary Examiner*—Stanley M. Urynowicz, Jr.
*Attorney, Agent, or Firm*—Jackson E. Stanland

[57] ABSTRACT

A magnetic bubble domain system using different types of magnetic bubble domains for representation of information. Different domain types are characterized by different numbers of vertical Bloch lines in their domain wall structures. In particular, a two-state system is described in which a bubble with a large number of vertical Bloch lines, called a "hard" bubble, collapses quasistatically at a higher bias field than a bubble with a smaller number (or no) vertical Bloch lines, called a "soft" bubble. Means are shown for producing hard and soft domains, writing information represented by these two types of domains, storing this information, propagating these domains, and reading the information so stored.

14 Claims, 17 Drawing Figures

FIG. 5 HARD DOMAIN GENERATOR
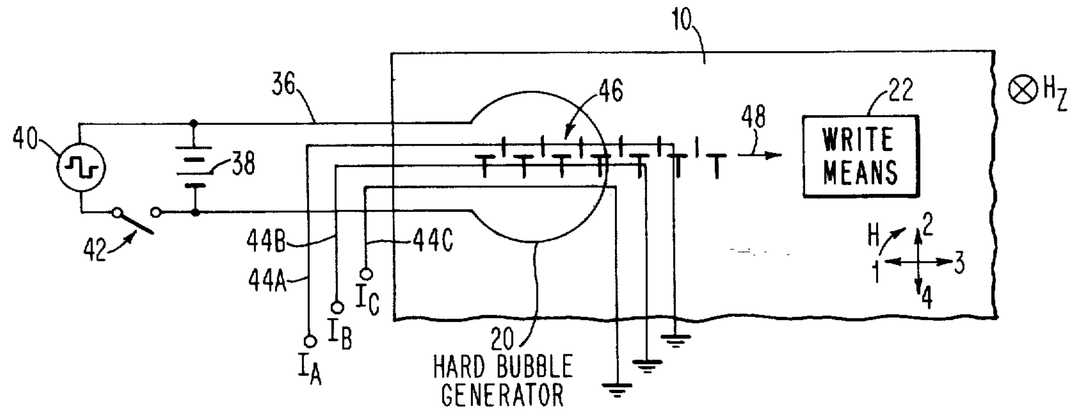
FIG. 6
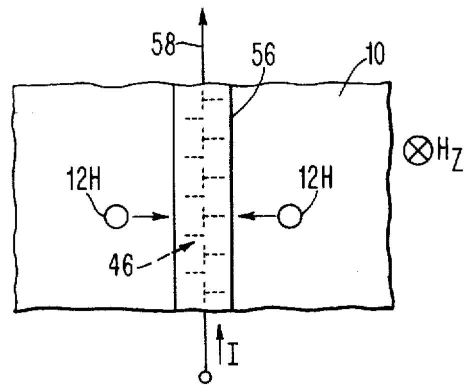
FIG. 7
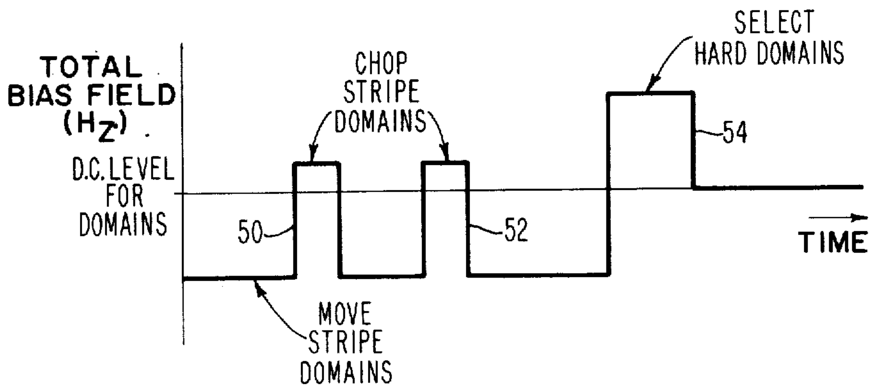

FIG. 8 STRIPE ELIMINATOR
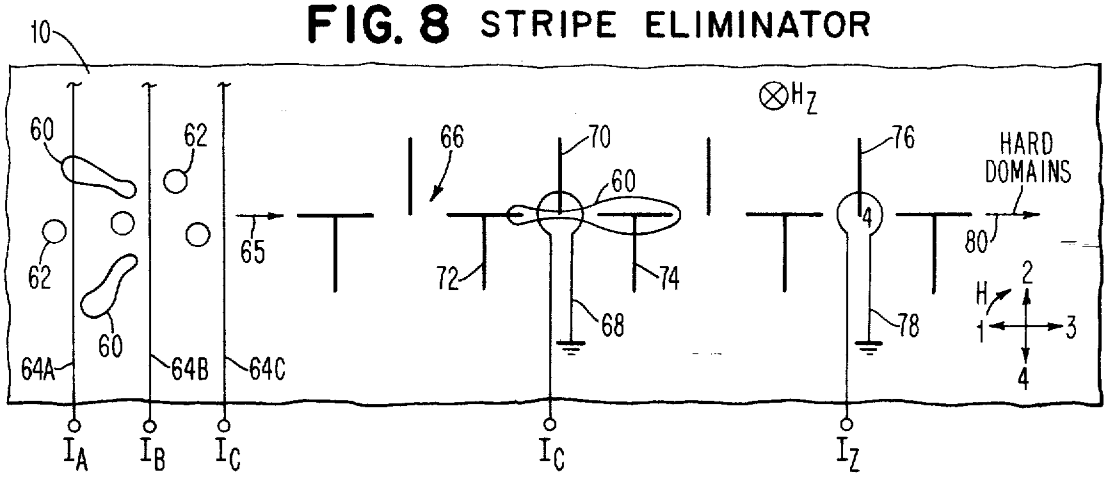
FIG. 9A WRITE MEANS
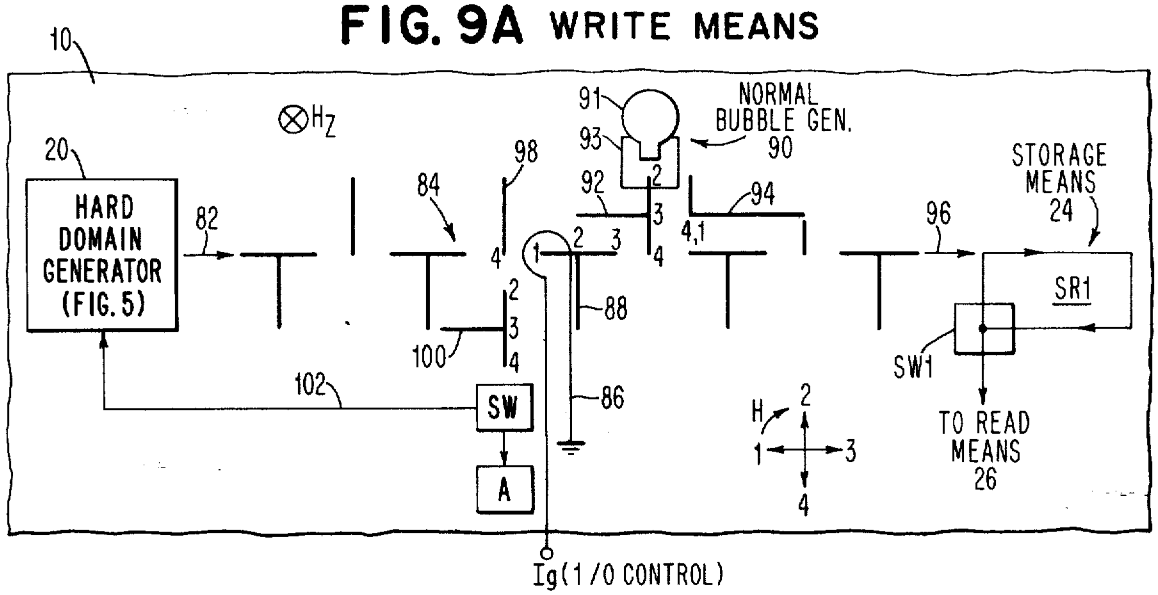
FIG. 9B WRITE MEANS
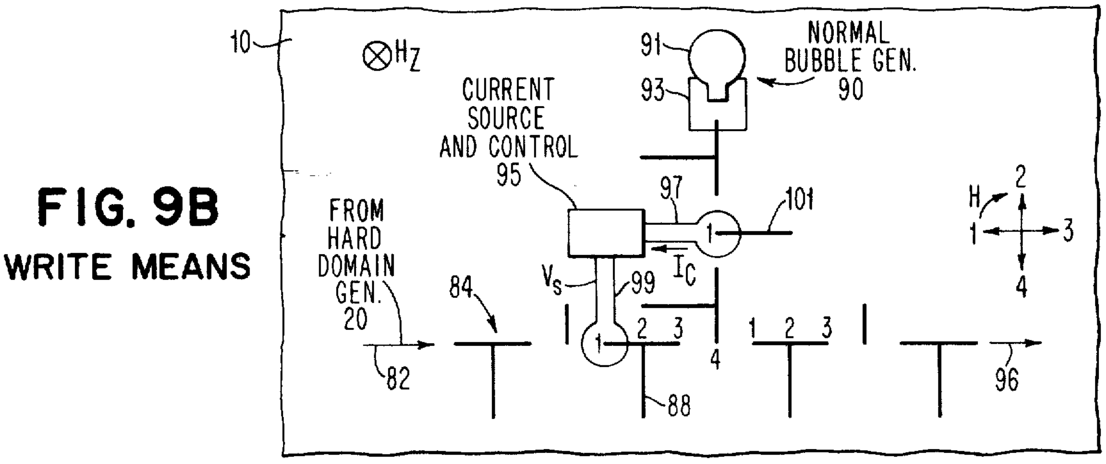

FIG. 10 READ MEANS
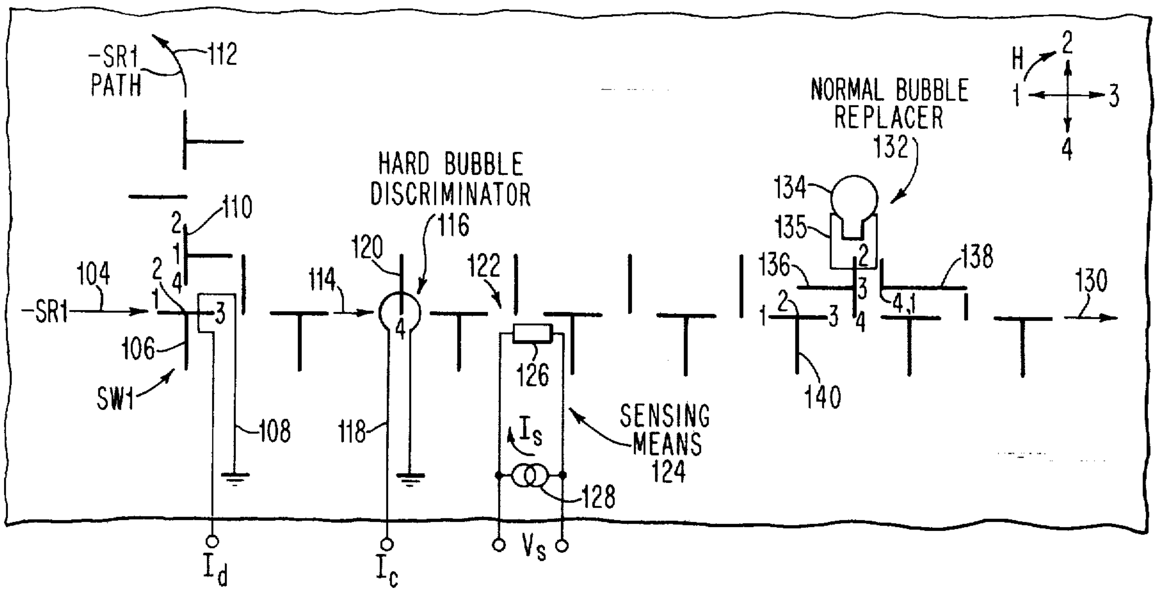
FIG. 11
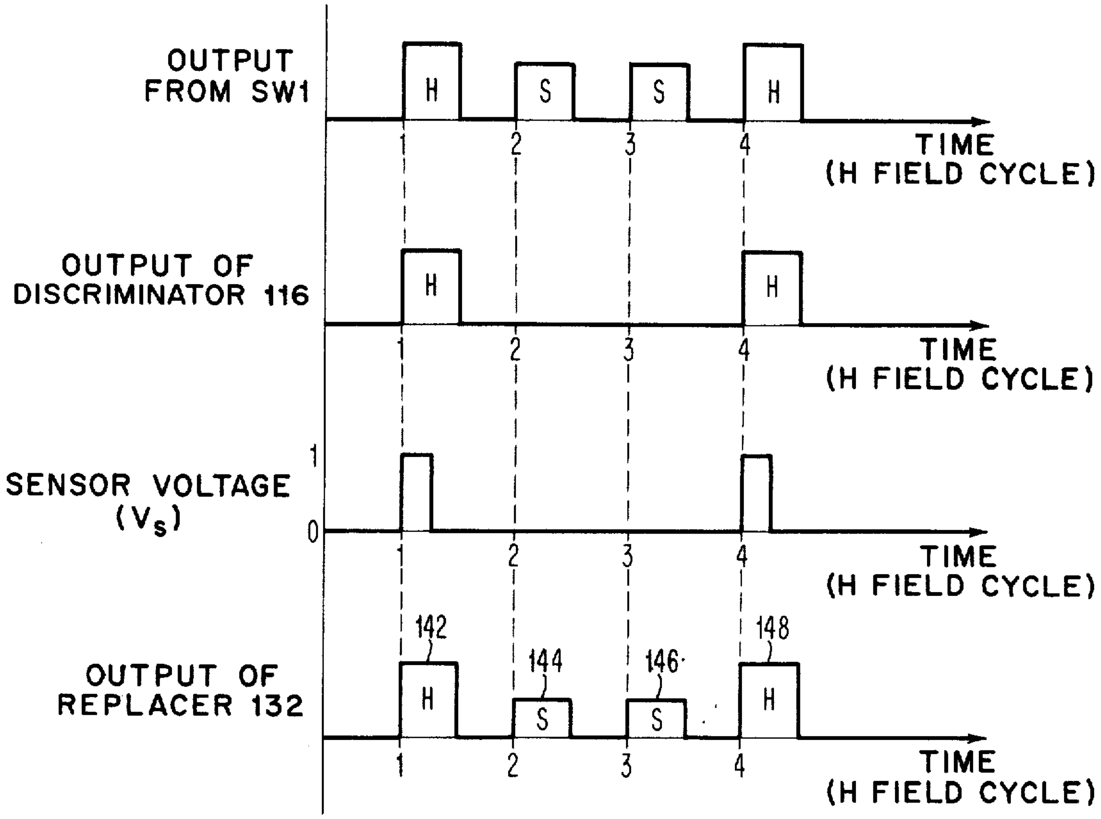

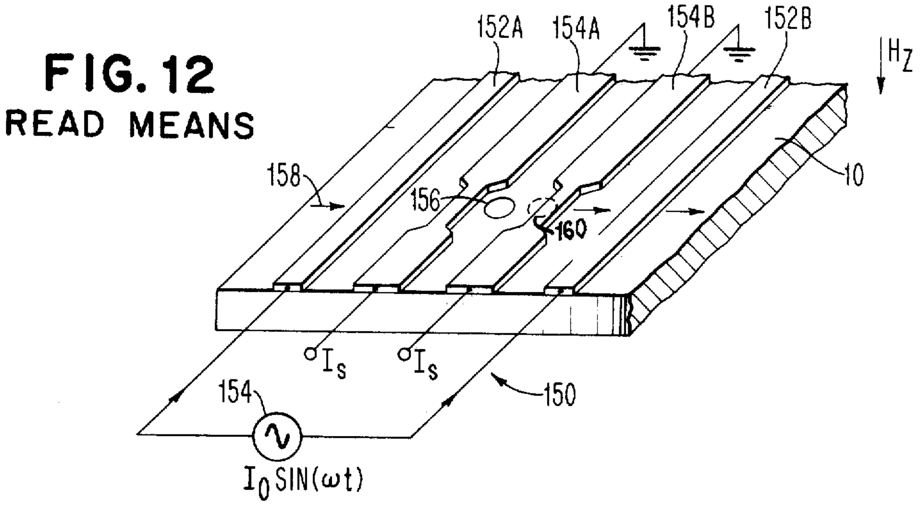
FIG. 12 READ MEANS
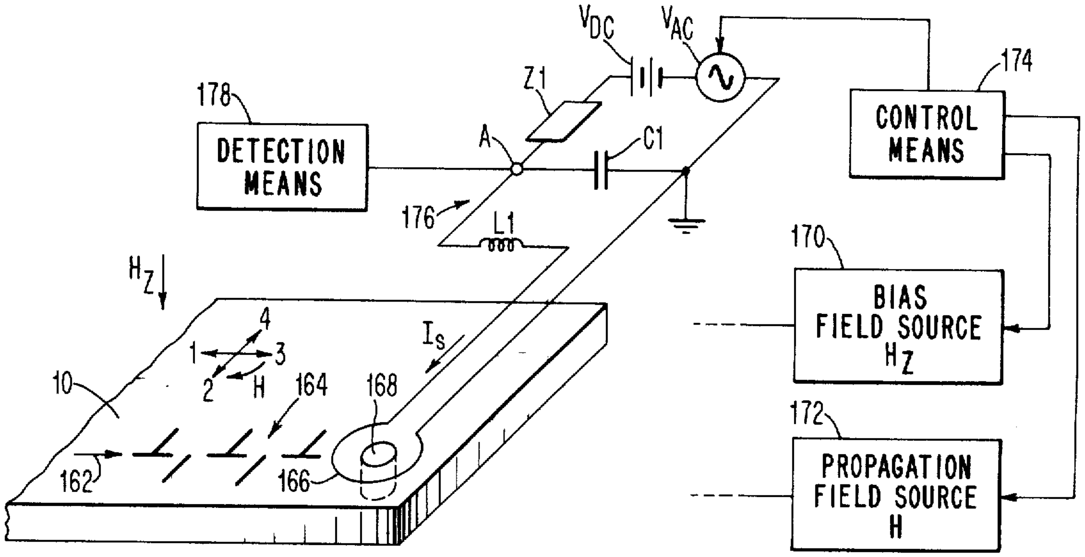
FIG. 13 READ MEANS

MAGNETIC BUBBLE DOMAIN SYSTEM USING DIFFERENT TYPES OF DOMAINS

CROSS REFERENCE TO RELATED APPLICATION

Copending application Ser. No. 375,289, filed the same day as the subject application, describes magnetic bubble domain systems using domains which deflect in a gradient magnetic field, due to their domain wall magnetization.

BACKGROUND OF THE INVENTION

1. Field of the Invention

This invention relates to magnetic bubble domain systems and more particularly to such a system using bubble domains having vertical Bloch lines therein (hard domains) as well as domains in which such Block lines may be nonexistent (soft domains) or very minimal in number.

2. Description of the Prior Art

Magnetic bubble domain systems are known in the art as exemplified by U.S. Pat. No. 3,701,125 and U.S. Pat. No. 3,689,902. In such systems, magnetic domains comprising a single domain wall which is closed upon itself and of generally cylindrical shape are used. These domains have magnetization perpendicular to the magnetic sheet in which they exist and oppositely directed to the magnetization of the sheet. The magnetization in the domain wall has generally been assumed to be of the Bloch wall type lying in the plane of the magnetic sheet and also in the plane of the domain wall.

Systems using the aforementioned domains (normal) have been provided and have utilized many functions, including storage, writing, reading, splitting, propagation, busting, generation, etc. In these systems, information is generally presented as the presence and absence of bubble domains which of course lends itself to binary data uses.

Additionally, apparatus using different types of domains of storage of information is shown in copending application Ser. No. 319,130, filed Dec. 29, 1972. In that application, domains having different apparent sizes are used to represent different information states, in contrast with the usual bubble domain systems where the presence and absence of domains is used to represent information.

Another bubble domain apparatus using different types of domains is shown in a publication by George Henry which appears in the IBM Technical Disclosure Bulletin, Vol. 13, No. 10, p. 3021, March 1971. In this article, domains represent different information states in accordance with the direction of circulation of their domain wall magnetization.

While such systems are very useful, the present invention seeks to use a newly discovered phenomenon that at least two types of magnetic bubble domains exist in the same magnetic sheet simultaneously and that these two different domain types have dissimilar properties which serve to distinguish them from one another.

These different domains have different numbers of vertical Block lines, which may roughly be throught of as vertical lines of twist in the wall magnetization, separating any two areas of the wall which have opposite directions of Bloch well magnetization.

In a recent article by A. P. Malozemoff, *Applied Physics Letters* 21, 149 (1972) it was shown that if there are enough vertical bloch lines along the domain wall of the bubble, then the bubble will collapse at a higher bias field than one with a smaller number of vertical Bloch lines. In addition, the diameter and mobility may be different depending on the number of vertical Bloch lines.

Although the bubble domains having vertical Bloch lines may be thought of as having less desirable properties than "normal" bubbles without Bloch lines, and therefore quite useless in bubble domain apparatus, the present invention seeks to exploit these different properties in a novel way. Rather then suppress these domains, they are utilized. In particular, if a bubble with several Bloch lines which collapses at a higher bias field is called a "hard" bubble and a bubble with few or no Bloch lines which collapses at a lower bias field is called a "soft" bubble, then a two state system may be constituted using the different collapse, diameter, or mobility properties of these bubbles to distinguish them.

Accordingly, it is a primary object of the present invention to provide an apparatus using bubble domains having different magnetic properties.

It is another object of the invention to provide an apparatus for magnetic bubble domain systems in which two different types of bubble domains can be maintained in the same magnetic sheet.

It is a further object of this invention to provide an apparatus in which multi-state bubble domains can be used for information representation in the same magnetic sheet each of which can be sensed according to its own properties.

It is a still further object of the invention to provide a magnetic bubble domain system which is stable and which uses multi-state bubble domains in which many different structures can be used to provide numerous functions.

It is another object of this invention to provide a magnetic bubble domain apparatus in which multi-state bubble domains are utilized and in which different size domains can be readily sensed.

SUMMARY OF THE INVENTION

Broadly, a magnetic system is provided in which different types of magnetic bubble domains are used. The different types of magnetic domains have different numbers of vertical Bloch lines, and therefore have different static collapse fields, different static diameters, and different mobility.

Means are provided for generating these different types of domains, for storing and sensing these domains, and for propagating these domains. in a manner consistent with existing magnetic bubble domain structures, various functions such as logic and memory can be provided.

A magnetic medium, such as a sheet of garnet or other bubble domain material, is provided in which the different types of domains can exist at the same time. Generally, a bias means is provided for stabilizing the size of domains within the magnetic sheet and means is provided for moving the domains within the magnetic sheet. The propagation means used to move the domains in the magnetic sheet can be comprised of conventional conductor patterns for carrying electrical currents or magnetically soft materials which provide attractive magnetic poles when a magnetic field is provided in the plane of the magnetic sheet.

Nucleation means is provided for generating bubbles with different numbers of vertical Bloch lines. Consequently, hard domains and soft domains can be provided. Additionally, a writing means is provided for creating patterns of hard and soft domains which can be representative of information. The magnetic sheet also has associated therewith a reading means for detection of these domains.

Magnetic systems using different types of magnetic domains can be designed for a variety of purposes including memory, storage, logic, and display. Once the basic functions are known, it is easily within the skill of those in the art to utilize these means for provision of various types of systems.

The foregoing and other objects, features and advantages will be more apparent from the following more particular description of the preferred embodiments.

BRIEF DESCRIPTION OF THE DRAWINGS

FIG. 4A shows a block diagram of a magnetic bubble domain system using both hard and soft bubble domains while

FIG. 5 illustrates an embodiment of a hard bubble generator which can be used in the system of FIG. 4A.

FIG. 6 illustrates an alternative structure for collecting hard domains in the generator of FIG. 5.

FIG. 7 illustrates the sequence of drive pulses used to produce hard domains in the generator of FIG. 5.

FIG. 8 illustrates an embodiment of a stripe eliminator used to produce magnetically hard domains from elongated domains. FIG. 9A shows a representative embodiment for the write means of FIG. 4, which is used to produce a pattern of information comprising different types of magnetic bubble domains.

FIG. 9B shows an alternate structure for a portion of the write means of FIG. 9A.

FIG. 10 shows a representative embodiment for the read means of FIG. 4, which is used to sense an information pattern represented by different types of magnetic bubble domains.

FIG. 11 is an illustration of a sample information pattern of two types of magnetic bubble domains illustrating the operation of the read means of FIG. 10.

FIGS. 12 and 13 show alternate embodiments for detecting hard and soft bubble domains.

DETAILED DESCRIPTION OF THE PREFERRED EMBODIMENTS

Until recently, domain walls in thin magnetic layers of bubble domain material were always assumed to be of the simple Bloch type, with the average wall moment lying in the planes of the wall and the film. Typically, in the absence of interactions with other domaiins, this type of normal domain runs out to an infinitely long stripe below a certain critical bias field exerted normal to the magnetic sheet in which the domains exist. At bias fields above this magnitude, the stripe domains run in to form a bubble domain whose diameter shrinks in a characteristic way with increasing bias field and which eventually collapses above a second critical field magnitude.

Recently, different types of magnetic bubble domains have been observed in a wide variety of garnet film bubble materials. Magnetic domain stripes exist which, even in the absence of interactions with other domains, have a reproducible dependence on length on applied magnetic field. Magnetic bubble domains also exist which have a different dependence of diameter on magnetic bias field from that of the normal bubbles and which collapse at higher magnetic field values.

In contrast with normal domains of the simple Bloch type, domains can exist in which two opposite directions of wall movement can exist. The transition regions between these oppositely directed regions of magnetization are called vertical Bloch lines. Recently, hard magnetic bubble domains have been observed which have sufficient numbers of vertical Bloch lines therein and which collapse at higher bias fields than do normal bubble domains. These effects are attributed to the mutual repulsion of neighboring vertical Bloch lines in the domain walls. Additionally, the radial mobility of hard domains is reduced by a significant factor in contrast with normal domains even in a low loss material.

A more detailed description of this phenomenon will be presented below, particularly with reference to FIGS. 1A, 1B, 2A, 2B, and FIG. 3.

Figure 1A:
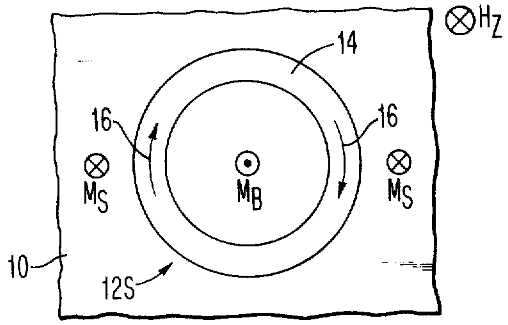
FIGS. 1A and 1B show a domain without vertical Bloch lines and a domain with vertical Bloch lines, respectively.
Figure 1B:
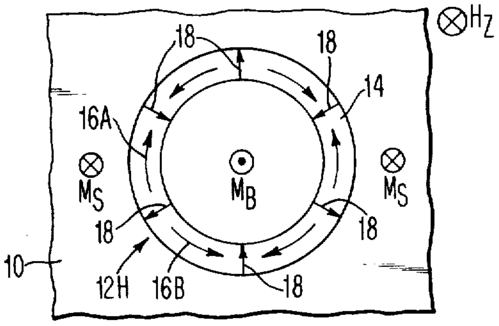
Figure 2A:
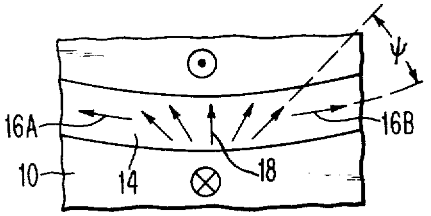
FIGS. 2A and 2B illustrate the rotation of magnetization vectors in a domain wall having vertical Bloch lines therein, where the rotation direction is opposite in these two figures.
Figure 2B:
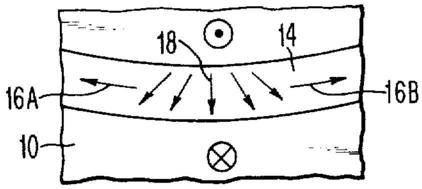

FIG. 1A shows a portion of a magnetic medium 10, such as a garnet film or any other type of bubble domain material, in which a normal bubble domain 12 has a domain wall 14. FIG. 1A, as well as FIGS. 1B, 2A, and 2B are views of the magnetic medium 10, and domain wall 14, taken along a midplane of sheet 10. That is, FIGS. 1A, 1B, 2A and 2B represent the domain wall at a plane approximately mid-way in the film thickness. The magnetization $M_S$ of medium 10 is directed downwardly while the magnetization $M_B$ of domain 12 is directed upwardly. A bias field $H_z$ exists across the magnetic sheet. The magnetization vectors of the domain wall 14 are indicated by the arrows 16 which are in the same direction around the periphery of wall 14. In this normal domain (soft domain) there are no regions of oppositely directed magnetization in the domain wall and consequently, no vertical Bloch lines exist in this normal domain.

FIG. 1B illustrates a second type of magnetic bubble domain. For ease of illustration, the same reference numerals will be used wherever possible. Accordingly, magnetic sheet 10 has magnetization $M_S$ directed downwardly while hard magnetic domain 12H has magnetization $M_B$ directed upwardly. A bias field $H_z$ exists across the entire magnetic sheet 10. The domain 12H of FIG. 1B is contrasted with domain 12S of FIG. 1A in that domain wall 14 of domain 12H has regions of magnetization which are oppositely directed. For instance, this is illustrated by magnetization vectors 16A and 16B which are in opposite directions. Located between magnetization 16A and 16B is a vertical Block line, illustrated by arrow 18. In FIG. 1B, there are other regions of oppositely directed magnetization in domain wall 14, and a plurality of vertical Bloch lines 18 exists. As will be more apparent later, the vertical Bloch lines must exist in pairs so that the total number of vertical Bloch lines will be an even number.

A Bloch line is defined as the transition region between any two areas of the domain wall having the two different wall magnetization directions possible for a Bloch wall in bubble film. In this transition region, there is always a point where the wall magnetization lies normal to the plane of the domain wall. Accordingly, the position of the Bloch line is defined by the locus of the points where the wall magnetization is normal to the plane of the domain wall.

A vertical Bloch line is defined as a Bloch line which extends substantially the full height of the bubble domain. In the case of a magnetically uniform sheet of bubble domain material, a vertical Bloch line will extend from the top surface of the sheet to the bottom surface of the magnetic sheet. However, the wall magnetization may be altered somewhat at the surfaces of the bubble domain material due to stray surface magnetic fields, as explained by J. Slonczewski at the Conference on Magnetism and Magnetic Materials, Chicago, Ill., November 1971 (published in the Conference Proceedings, No. 5, 1971). Therefore, the vertical Bloch line more correctly can be thought to extend from near the top surface of the bubble domain material to near the bottom surface of the bubble domain material, in the case of a magnetic material which has uniform magnetic properties throughout its depth.

FIGS. 2A and 2B illustrate the two types of rotation which can exist for the magnetization between two regions of oppositely directed magnetization in a domain wall 14. In these figures, a complete domain wall is not shown for ease of illustration. Vertical Bloch lines are "twist" regions between oppositely directed magnetization. For instance, magnetization directions 16A and 16B are oppositely directed in FIG. 2A. The magnetization vectors will rotate in order to provide a transition region between the oppositely directed regions and the angle of wall magnetization in the film plane is illustrated by the angle $\psi$. The vertical line of transition between right handed and left handed Bloch segments is illustrated by the vector 18.

In FIG. 2B, the magnetic moments (magnetization vectors) rotate in the opposite direction between the oppositely directed magnetization vectors 16A and 16B. Thus, vertical Bloch lines having different signs can be produced. On the one hand, the vertical Bloch line 18 of FIG. 2A may be termed a plus vertical Bloch line while that of FIG. 2B may be termed a negative vertical Bloch line.

An isolated vertical Bloch line has a characteristic width of $\Delta'_{BL} = \sqrt{A/2\pi M^2}$ in the limit of large (1)

$Q = K/2\pi M^2$. (2)

Here, $A$ is the exchange energy constant $M$ is the magnetization $K$ is the uniaxial anisotropy.

In this limit the vertical Bloch line energy is only a fraction of the normal wall energy and cannot therefore be expected to have large effect on the static properties of a domain. However, this result is modified if interactions between vertical Bloch lines are considered. Two adjacent vertical Bloch lines are attracted to each other by magnetostatic forces and, if they have opposite handedness (sign) they can annihilate leaving a pure Bloch wall. However, if they have the same handedness they will repel each other due to exchange forces. Therefore, in a domain with n Bloch lines all of the same handedness, the exchange energy can become significant when the perimeter P of the domain is reduced to the point where the vertical Bloch lines crowd in against each other and the actual vertical Bloch line width is constrained to be less than the width of an isolated vertical Bloch line. In this limit the wall magnetization rotates at a constant rate along the wall perimeter; that is, the angle $\psi$ approaches $N\pi x/P$ where $x$ is the distance along the wall perimeter.

As mentioned previously, the number of Bloch lines $n$ must be an even number for in a physical system when $x = P$, $\psi$ must have increased by an integer multiple of $2\pi$. Therefore, the extra exchange energy due to the interacting vertical Bloch lines is given by the following expression:

$$E_{BL} = 2A\Delta \left(\frac{\delta\psi}{\delta x}\right)^2 Ph \quad (3)$$

$$= 2n^2\pi^2 A\Delta h/P$$

where $h$ is the film thickness $\Delta$ is the square root of $A/K$ (Bloch wall width).

Figure 3:
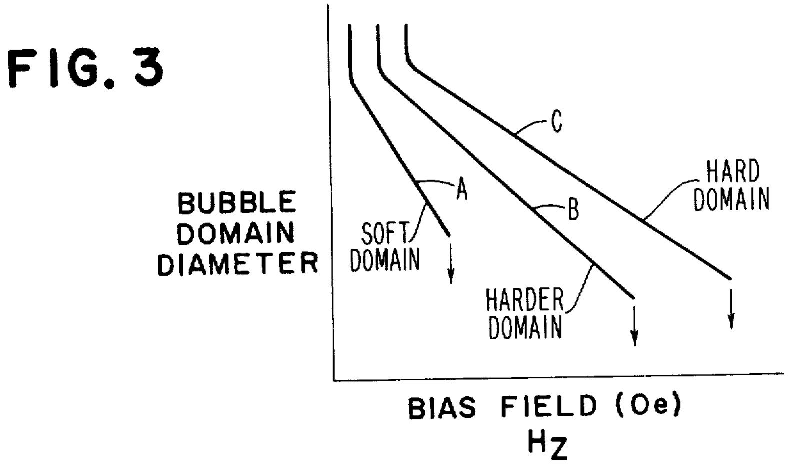
FIG. 3 shows a plot of bubble domain diameter versus bias field normal to the magnetic sheet and illustrates the different collapse properties of these two different types of domains.

FIG. 3 illustrates the difference in properties of the hard and soft bubble domains in varying magnetic bias fields $H_z$. Curve A illustrates the behavior of soft domains, curve B illustrates the behavior of harder domains and curve C represents the behavior of a hard domain. As is apparent from these curves, the hard domains collapse at higher quasi-static bias fields than do normal domains or intermediate bubble domains (curve B). Additionally, domains having different number of vertical Bloch lines have different static diameters an different mobilities. Thus, domains having different numbers of vertical Bloch lines can be given different informational states, due to their differing properties.

MAGNETIC BUBBLE DOMAIN SYSTEM

Figure 4A:
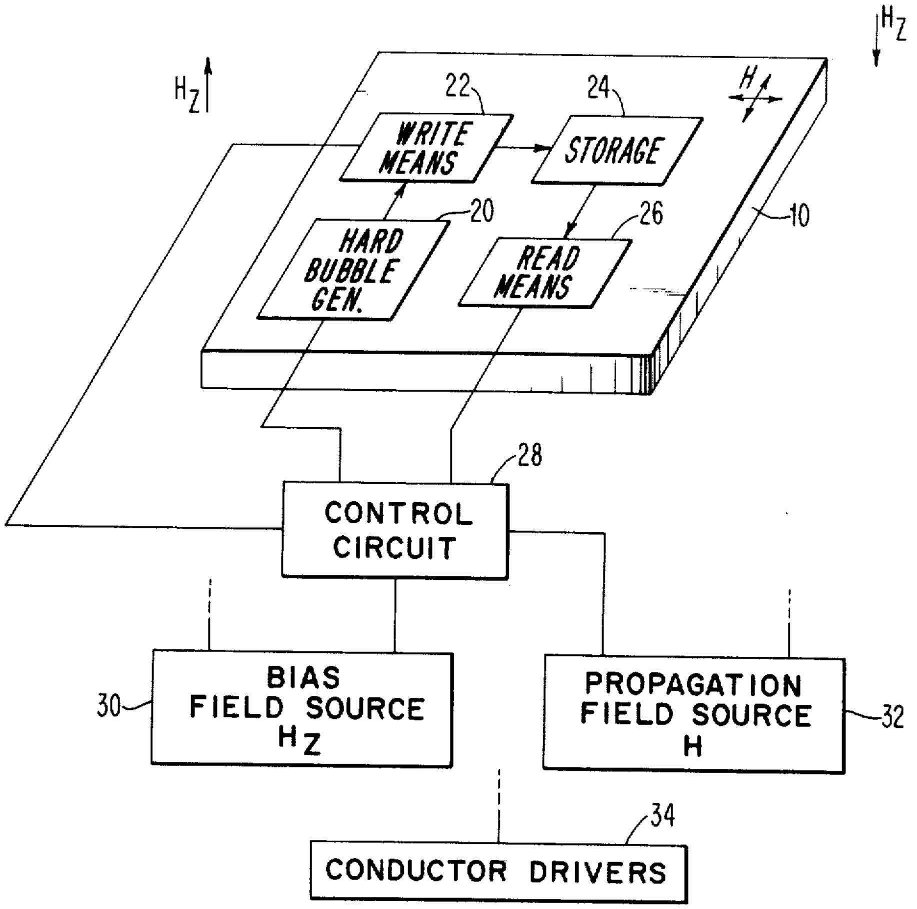

FIG. 4A shows a magnetic bubble domain system using bubble domains of different types. The magnetic sheet 10 can be any bubble domain material including garnets, orthoferrites, etc.; generally, magnetic sheet 10 is in the form of a layer having thicknesses of the order of microns. These sheets are prepared on various suitable substrates such as garnet substrates.

Located adjacent to or on magnetic sheet 10 are various components used in the bubble domain system. For instance, a generator 20 is used to provide hard domains and a write means 22 is used to produce a pattern of hard and soft domains which can be representative of information. The use of hard and soft domains for representation of information is particularly suitable for binary information although other types of information can also be represented. A storage means 24 is provided as part of the information system if it is desired to store the domain information. Shift registers are particularly suitable for this purpose and domains of varying hardness can be made to propagate in various shift registers.

A read means 26 is used to detect the domains to provide an indication of the presence and absence of hard and soft domains. A control circuit 28 provides the necessary clocking signals to the various components of the bubble domain system to synchronize operation in a known manner.

Also associated with the bubble domain system are the bias field source 30 which produces the bias field $H_z$ normal to magnetic sheet 10, and the propagation field source 32 which is used to provide a reorienting magnetic field H in the plane of film 10. Of course, conductor patterns can be used for movement of domains in magnetic sheet 10 and in this case various conductor drivers 34 would be provided for producing currents in the propagation conductors.

Thus FIG. 4A shows the provision of various functions which can be used in a bubble domain system employing different types of magnetic domains in which information is represented by the presence of vertical Bloch lines in the domain wall structure. All functions can be provided using these different types of domains.

Figure 4B:
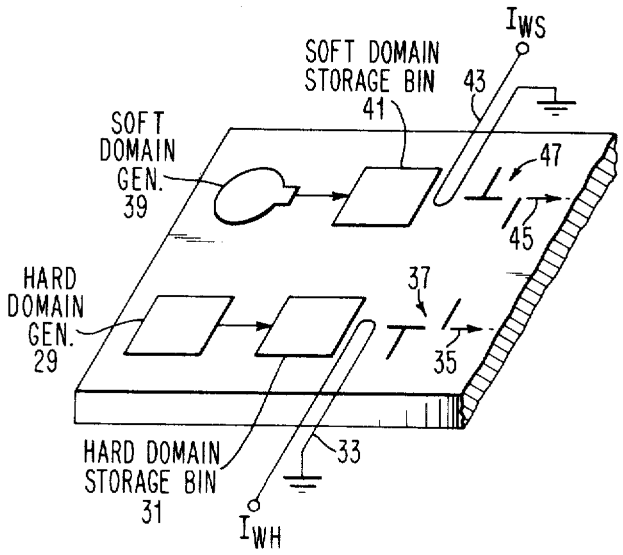
FIG. 4B shows a writing means which separates hard and soft domains (domains of different numbers of vertical Bloch lines).

FIG. 4B shows a portion of a bubble domain system in which separate generators are used to provide hard and soft domains. These domains are then stored in bins and removed from the bins as desired.

In more detail, magnetic sheet 10 has located adjacent to it a hard bubble domain generator 29 which provides hard domains to the hard domain storage bin 31. Depending on the presence and absence of suitable write currents $I_{WH}$ in conductor 33, hard comains will be taken from bin 31 and propagated in the direction of arrow 35, via propagation means 37. In a similar manner soft domain generator 39 provides soft domains to storage bin 41. The soft domains can be removed from bin 41 by write currents $I_{WS}$ in conductor 43. The soft domains then travel in the direction of arrow 45, due to propagation means 47.

HARD BUBBLE GENERATOR (FIG. 5)

FIG. 5 shows an embodiment for the hard bubble generator 20 of FIG. 4A. In this embodiment, hard bubble domains are created which are then collected and moved to the write means 22 (also shown in FIG. 4A).

More specifically, generator 20 is comprised of a coil 36 connected to a dc bias source 38 and to a pulse source 40 which can be selectively connected in parallel with source 38 via switch 42. Within coil 36 there are provided a plurality of current-carrying conductors 44A, 44B, and 44C. These conductors are connected to sources (not shown) which provide currents $I_A$, $I_B$, and $I_C$ through conductors 44A, 44B, and 44C, respectively.

Also located within coil 36 is a propagation means 46 which in this case comprises T and I bar patterns of magnetically soft material such as permalloy. Domains brought to propagation pattern 46 will move in the direction of arrow 48 in response to rotation of magnetic fields H in the plane of magnetic sheet 10.

The operation of hard bubble generator 20 is most clearly illustrated by considering the plot of FIG. 7 together with the structure of FIG. 5. In FIG. 7, the total bias field $H_z$ existing within the area of coil 36 is illustrated as a function of time.

The dc level of bias field $H_z$ is provided by dc source 38. Fluctuations in the net bias field within coil 36 are provided by current pulses generated by pulse source 40. This causes the net bias field within coil 36 to change in accordance with the sample plot of FIG. 7.

Initially, a negative pulse is provided by source 40 in order to lower the net bias field in the area of coil 36. This creates an attractive region for magnetic stripe domains in sheet 10 such that these domains will move within the area of coil 36. At this time, a positive pulse is produced by source 40 to raise the level of the bias field above the dc level. For sufficiently short and strong pulses, this will cause a chopping of the stripe domains in the area of coil 36. In FIG. 7, two pulses 50 and 52 are produced for chopping the stripe domains. Generally, the number of hard domains produced by this chopping action is increased with the number of pulses applied. After this, the net bias field is increased greatly in the area of coil 36 in order to collapse other than hard domains. Consequently, after application of pulse 54, the only domains remaining in the area of coil 36 are hard magnnetic domains.

The hard domains are then moved to the vicinity of propagation means 46 by applying current pulses in the conductors 44A, 44B, and 44C. The magnetic fields produced by currents in these conductors create bias field gradients which will attract the hard domains to the vicinity of propagation means 46. Once in that vicinity, they will be attracted to magnetic poles created on the T and I bars when the propagation field H is produced. These hard domains will then propagate in the direction of arrow 48 in a well known fashion.

As a representative example, hard domains were created in a magnetic sheet of 5.25 microns thickness having the composition $(Tb_{0.04}\,Eu_{0.66}\,Y_{2.3})\,Fe_{3.85}\,Ga_{1.15}\,O_{12}$. The bias field pulses applied to sheet 10 generally range from about 10 Oe. to 50 Oe. and have a duration from about 0.2 microseconds to about 10 microseconds. The number of pulses applied by source 40 can be varied from 1 to practically any number. The number of applied pulses will generally depend upon the distribution of the various types of domains desired to be produced. Generally, as the number of applied pulses increases, there is a greater likelihood to create domains having larger numbers of vertical Bloch lines. Correspondingly, the longer the duration of the applied pulses the greater the likelihood to collapse domains other than those with large numbers of vertical Bloch lines. Of course, the final pulse 54 is of such magnitude as to remove all domains other than those having a minimum desired number of vertical Bloch lines in their domain walls. This ensures that sufficiently hard bubbles are obtained for the particular operation desired.

Generally, the magnitude of the applied pulses depends to some degree on the magnetization $4\pi M_S$ of the magnetic sheet. As $4\pi M_S$ increases, higher values of magnetic bias pulses will be required to produce the hard domains. Generally, up to about 50 percent of $4\pi M_S$ is a resonable range for the magnitude of applied bias field.

The longer the duration of the applied chopping pulses, the better is the chance that chopping will occur. After this, the longer the duration of the applied pulse, the greater the likelihood that the domains will collapse. Roughly speaking, an estimate of the pulse duration required to chop domains can be given by the following expression:

$$t = \frac{\alpha D}{\gamma \Delta H_z} = \frac{D}{\mu H_z} \qquad (4)$$

where $\alpha$ is the damping coefficient $\gamma$ is the gyromagnetic ratio $\mu$ is the mobility of normal domain walls $H_z$ is the change in magnetic bias field D is the domain diameter (stripe width)

$\Delta$ is the domain wall width.

The conductors and coil used to provide the hard bubble generator 20 can be deposited on magnetic sheet 10 or on a layer of insulation located over sheet 10. Additionally, these can be part of a separate structure which is brought into proximity to sheet 10 for the hard bubble generation. The provision of hard domains can easily be done at the time the magnetic bubble domain system is being fabricated. Consequently, a reservoir of hard and soft domains can be provided for use by the user of these systems (see FIG. 4B). In this case, the hard domain generator need not be a portion of the system which is delivered, but instead could be utilized in the manufacturing facility.

The operation used to produce hard bubble domains may also produce some "dumbbell" bubble domains which are elongated domains shaped like dumbbells which have bulbous ends and a narrow body. These domains exhibit a rotation when the magnetic bias field is pulsed. Some dumbbells can become elliptical and eventually turn into bubbles. Generally, dumbbells are very large domains with many vertical Bloch lines in their domain walls. There is no upper limit to the number of vertical Bloch lines that can be accommodated in a dumbbell of arbitrary length. However, dumbbells will collapse at lower bias fields than hard domains. Consequently, application of bias pulse 54 (FIG. 7) will ensure that such dumbbell domains will be removed before collection of the hard domains by propagation means 46.

FIG. 6 shows an alternate embodiment for a structure used to collect hard domains 12H. In this embodiment, a single wide conductor 56 is provided. This conductor is connected to a current source (not shown) which provides currents ± I in conductor 56. Located below conductor 56 (or on the other side of magnetic sheet 10) is the propagation means 46.

In operation, currents through conductor 56 will create localized magnetic fields which alter the net bias field $H_z$ on either side of conductor 56. Domains 12H will respond to the so produced gradient in bias field and will move in a general direction toward the conductor, depending upon the direction of current in conductor 56. For instance, a current +I flowing in the direction of arrow 58 will create a magnetic field gradient causing domains 12H initially located at the left of conductor 56 to move toward propagation means 46. Correspondingly, the current −I in conductor 56 will lead to an attraction of domains 12H located on the right hand side of conductor 56.

Many other means can be envisioned for attracting the hard domains 12H to a collection area. For instance, various patterns of magnetically soft materials can be located throughout the area enclosed by coil 36 in order to provide attractive regions for the hard domains. These patterns can be designed so that the hard domains will all be moved to a common region as the in plane propagation field H rotates.

STRIPE ELIMINATOR (FIG. 8)

FIG. 8 shows a stripe eliminator which can be used to change large magnetic stripes to usable domains, for instance domains having vertical Bloch lines therein. In this drawing, a collection of domains is shown at the left in which stripe domains 60 and conventional bubble domains 62 exist. A plurality of conductors 64A, 64B, and 64C are connected to sources providing currents $I_A$, $I_B$, and $I_C$. As was illustrated previously, these currents produce magnetic fields which produce a gradient bias field that causes the domains 60 and 62 to move to a propagation means 66, illustrated here by T and I bar patterns. In response to the rotating magnetic field H in the plane of magnetic sheet 10, the domains 60 and 62 will have a component of motion in the direction of arrow 65.

A current carrying coil 68 is provided which locally changes the magnetic field along one pole of I-bar 70. A very large stripe domain 60 will move such that it is held at its end by T bars 72 and 74. Current $I_C$ in coil 68 which produces a magnetic field aiding the bias field $H_z$ will cause a splitting of this large domain 60, thereby producing two domains. These domains may contain vertical Bloch lines which would make them suitable for use as hard domains in a system.

After being split, the split domains continue in their propagation to the right until they are located at pole 4 at the end of I-bar 76. A current $I_Z$ in coil 78 will produce a localized increase in bias field $H_z$ which is sufficient to collapse all domains except these desired for use as hard domains. Thus, coil 78 serves as a hard domain discriminator.

After discrimination, only hard domains will continue to propagate in the direction of arrow 80. These domains can be used to represent information in a later operation.

The stripe eliminator is used primarily for breaking very large stripe domains. If the area of the discriminator coil 78 is sufficiently large to collapse all stripe domains, the discriminator coil 68 will not be needed.

WRITE MEANS 22 (FIG. 9A)

The write means creates a pattern of hard and soft bubbles which can be used to represent information, such as binary, analog, or other forms of information. Additionally, this pattern of information may comprise domins which are to be illuminated by the incidence of polarized light, thereby creating a display.

In this embodiment of a write means, hard domains continually enter the write and affect the delivery of soft domains to a propagation means in which the information pattern is propagated. The presence or absence of a hard domain is utilized to influence the delivery of soft domains to the propagation means, thereby creating the information pattern. In this embodiment, the storage means 24 is shown illustratively as a shift register loop SR1. Of course, it should be understood that a plurality of storage means can be provided along with a plurality of domain generators and propagation means. Additionally, decoder circuitry, such as that shown in U.S. Pat. No. 3,701,125 can be utilized.

In more detail, the hard domain generator 20 (shown in FIG. 5) provides a series of hard domains which propagate in a direction of arrow 82 via conventional propagation means. These hard domains are further propagated by propagation means 84, shown here as comprised of T and I bars made of magnetically soft material. Under the influence of attractive magnetic poles created by reorientations of the in-plane magnetic field H, these hard domains are moved by propagation means 84. A current carrying coil 86 is located to provide a magnetic field in the direction of the bias magnetic field at pole position 1 of T-bar 88.

A normal domain generator 90 of the type illustrated in copending application Ser. No. 266,758, filed June 27, 1972, provides soft bubble domains each cycle of rotation of drive field H. This generator splits domains from a resident bubble domain associated with a permalloy disc 91, and has another layer 93 of permalloy for suppressing any hard domains which may be formed. Rather than the "splitter" type of generator, a nucleating generator can be used, as is shown in U.S. Pat. No. 3,662,359. Again, a layer of permalloy is used to suppress hard bubbles. These normal domains travel downwardly to the propagation means 84, following repetitive pole patterns 2, 3 and 4 on T-bar 92. Associated with the normal domain generator is an L-bar 94 which serves as an annihilator of the soft domains produced by normal generator 90. For certain circumstances, domains produced by generator 90 are deflected to annihilator 94 and do not enter the information pattern traveling to the right along propagation means 84, as will be explained in more detail later.

The final information pattern of hard and soft domains continues in the direction of arrow 96 and enters the storage means 24, shown here as a closed loop shift register SR1. The information pattern rotates continuously around the shift register loop. Depending upon the activation of switch SW1, this information can be selectively gated to read means 26, or can be recirculated in the register.

In operation, hard domains enter propagation means 84 and move to pole position 4 on I-bar 98. If a current $I_g$ exists in loop 86 at this time, the hard domains at the end of I-bar 98 will not see an attractive pole at pole position 1 of T-bar 88. Consequently, they will remain in pole position 4 of I-bar 98. As the propagation field H continues to rotate, the domains will be attracted to pole position 2 on the T-bar 100. After this, the domains will continue to pole positions 3 and 4 on T-bar 100 and will enter switch SW. This switch is a conventional one and will send the domains either to annihilator A or back to the hard domain generator 20 via path 102.

Thus, hard domains at pole position 4 of I-bar 98 will be allowed to pass further to the right depending upon the presence and absence of current $I_g$ in loop 86. Thus, a gate is provided for the passage of hard domains.

A soft domain is produced by normal domain generator 90 each cycle of rotation of field H. The soft domains propagate to T-bar 92 and follow successive pole positions 2, 3 and 4 to the propagation means 84, after which they travel to the right along the direction indicated by arrow 96 in response to the rotation of field H. However, if a hard domain passes through the successive pole positions 1, 2 and 3 of T-bar 88, a soft domain from generator 90 will not be able to move from pole position 3 to pole position 4 on T-bar 92. Consequently, on the next rotation of field H, the soft domain will move from the pole position 3 on T-bar 92 to pole position 4 on L-bar 94. When field H rotates to position 1 the soft domains will continue to be trapped at the elbow of L-bar 94. When field H continues to direction 2, a negative pole will be produced at the elbow of element 94 which will collapse the domain located here. This collapse is then enhanced when the field H rotates to position 2. Consequently, the presence of hard domains on T-bar 88 influences the entry of soft domains from generator 90 to propagation means 84. In this manner, an information pattern of hard and soft domains will be sent to storage means 24.

FIG. 9B shows an alternate embodiment for the normal bubble domain generator 90 and associated structure which provides domains into the propagation means 84. In this case, a current loop 99 sense hard domains at pole position 1 of T-bar 88. This produces a voltage which is sent to current source and control 95. In turn, a current $I_c$ is produced in current loop 97 which is located in the propagation path of soft domains from generator 90. Current $I_c$ produces a magnetic field which collapses soft domains located at pole position 1 of I-bar 101. However, if a hard domain is not sensed by loop 99, no current $I_c$ will be produced in coil 97 and the soft domain from generator 90 will be allowed to enter propagation means 84.

READ MEANS 26

FIG. 10 shows a read means for detecting the information pattern stored in any shift register, such as SR1. Also shown in this drawing is the switch SW1 used to selectively gate information from storage to the read means.

In FIG. 10, switch SW1 is a current controlled switch which is usec to nullify an attractive magnetic pole at a location on T-bar 106 in order to change the direction of a magnetic domain. Such current dontrolled switches are well illustrated in aforementioned U.S. Pat. No. 3,701,125.

The read means also includes a hard bubble discriminator which is used to collapse all soft domains, thereby allowing only hard domains to pass. These hard domains are then sensed by any type of bubble domain sensor, such as magnetoresistive sensor which is shown more particularly in U.S. Pat. No. 3,691,540. After the information is sensed, the soft domains have to be reestablished in the information pattern in order to provide nondestructive read out. Consequently, a soft domain generator is used to reenter the information in the proper sequence.

In more detail, a pattern of hard and soft domains is circulating in register SR1, following the propagation path indicated by arrow 104. This information is attracted to pole position 1 on T-bar 106, after which it moves to pole positions 2 and 3 on T-bar 106. However, if current $I_d$ is present in current carrying coil 108, the attractive pole normally present at position 3 on T-bar 106 when field H is in direction 3 will not be created and the domain will stay at pole position 2 on T-bar 106. When field H then rotates to position 4, domains on pole position 2 of T-bar 106 will move to pole position 4 on T-bar 110. As field H continues to rotate, these domains will propagate upwardly following path 112 which is the normal propagation path for register SR1.

If domains have not been deflected to path 112, they will continue to the right along the direction indicated by arrow 114 and will enter the hard bubble discriminator 116. This discriminator is comprised of a current carrying coil 118 which is connected to a current source providing a current $I_c$. Current $I_c$ in coil 118 produces a magnetic field in the same direction as the bias field $H_z$. This increases the bias field at pole position 4 of I-bar 120, thus collapsing all soft domains which appear at this location. This means that only hard domains will continue propagating to the right along the T and I bar pattern 122.

Domains propagating along pattern 122 will then pass a sensing means 124, which is shown in this case as a magnetoresistive sensor. Sensing means 124 illustratively includes a magnetoresistive sensing element 126 which is connected to a current source 128. Source 128 produces a measuring current $I_s$ through sensing element 126. When a domain passes element 126, the magnetization vector of the element will be rotated causing a resistance change. This resistance change is manifested as a voltage change $V_s$ indicative of the presence of a hard domain in flux-coupling proximity to element 126. If no domain passes sensing element 126 during a cycle of drive field H, this will indicate that a soft domain was originally present at that cycle time. As stated previously, discriminator 116 has removed that soft domain.

After being sensed, domains propagate further to the right along the direction indicated by arrow 130. The domains pass a structure which is a normal (soft) bubble replacere 132. This structure is similar to that used in the write means of FIG. 9A. The normal bubble replacer 132 is comprised of a normal bubble generator 134 and magnetically soft layer 135 (for suppression of hard bubbles), together with propagation means 136 and annihilator 138. During each cycle of field H, a single soft domain is produced by generator 134 and propagates along T-bar 136. However, if a hard domain is at pole position 3 of T-bar 140, domains from generator 134 will be deflected from element 136 to the elbow of element 138 where they will be subsequently annihilated as field H rotates. However, if hard domains are not present at pole position 3 of T-bar 140 at this time, domains produced by generator 134 will propagage to the horizontal propagation means 122 and will continue to the right in the direction of arrow 130. Thus, the original combination of hard and soft domains from SR1 will be re-established.

The operation of the structure of FIG. 10 is clearly illustrated by the schematic diagram shown in FIG. 11. This diagram shows the domain patterns at various positions along the structure of FIG. 10. Pulses labeled either "H" or "S" are used to signify hard and soft domains, respectively. These pulses are shown at various cycles of the magnetic drive field H.

The upper most plot in FIG. 11 shows a representative information pattern obtained at the output from switch SW1. This may be, for instance, the information pattern propagating to the bubble discriminator 116. In this case it is comprised of a hard domain at the first H field cycle, soft domains at the second and third H field cycle, and a hard domain at the fourth H field cycle.

The second plot in FIG. 11 shows the output of discriminator 116. Only the hard domains at cycles 1 and 4 of the propagation field exit from discriminator 116, the soft domains having been collapsed by the high magnetic fields produced in the discriminator.

The third plot of FIG. 11 shows the output of sensing means 124. This is a plot of the voltage signals $V_s$ produced across sensing element 126. In this case, the hard domains are indicated as providing a sensor voltage $V_s$ having a value 1 while the absence of domains at H field cycles 2 and 3 leads to voltage signals of zero.

The normal bubble replacer circuit 132 reestablishes the original information pattern coming from switch SW1. At the first drive field cycle, the hard domain indicated by pulse 142 exits along the path indicated by arrow 130. During the next two field cycles of drive field H, no hard domains are present at T-bar 140 to influence the entry of soft domains from generator 134. Consequently, bubble replacer 132 provides soft domains 144 and 146 during drive field cycles 2 and 3, respectively. At drive field cycle 4, another hard domain is present on T-bar 140 and prevents soft domains from entering the propagation means 122. Consequently, a hard domain 148 leaves propagation means 122. In this manner, the information pattern is repeated and nondestructive readout is obtained.

In a manner consistent with that shown in aforementioned U.S. Pat. No. 3,689,902, this information pattern can be utilized elsewhere in a bubble domain system or can be sent back to the storage means for continued recirculation.

ALTERNATE EMBODIMENTS

FIGS. 12 and 13 illustrate additional ways to detect hard and soft domains. These additional detection means do not destroy the soft domains as does the read means of FIG. 10. In FIGS. 12 and 13, the sensing embodiments utilize the differences in dynamic behavior between soft and hard domains. The main feature used for differentiating the types of bubbles domains is their difference in wall mobility.

In FIG. 12, the magnetic sheet 10 has a reading means 150 located adjacent the magnetic sheet. This reading means can be deposited directly on the magnetic sheet or on an insulating layer over the magnetic sheet. Additionally, it can be part of a separate support system which is brought into close proximity to the magnetic sheet.

Reading means 150 generally comprises conductors such as 152A and 152B which carry sinusoidal current from source 154. Of course, a current generated by source 154 need not be sinusoidal in time. Located between the conductors 152A and 152B are sensors 154A and 154B. These are any type of sensors which will respond to the magnetic field of a domain 156. Preferably, magnetoresistive sensing elements are used. Sensors 154A and 154B have current $I_s$ flowing through them. As has been explained previously, when the magnetic field of the bubble domain 156 couples to either of the magnetoresistive sensors, a voltage will be generated across the sensor which can be measured.

In operation, domains are propagated in the direction of arrow 158 to reading means 150. Currents through conductors 152A and 152B can be used to move the domains to a position between these conductors. Alternatively, magnetic patterns can be used to precisely locate the domain 156 centrally between sensing elements 154A and 154B. These propagation means can be located on the underside of magnetic sheet 10, or directly on the top surface of sheet 10.

Alternating currents in conductors 152A and 152B produce an oscillating gradient in the magnetic bias field $H_z$ existing in the area between sensing elements 154A and 154B. This oscillating gradient field at the position of domain 156 will cause the domain to undergo sinusoidal oscillations in displacement. Since hard domains oscillate with smaller amplitude than soft domains, the hard domains will not oscillate enough to have their magnetic fields interact appreciably with the sensing elements 154A and 154B. However, the soft domains will oscillate sufficiently to have a maximum displacement to bring them to the position indicated by dashed lines 160. This will cause an interaction with sensing elements 154A and 154B which will provide an output signal indicative of the presence of a soft domain. Thus, the hard domains will produce no voltage change across the magnetoresistive sensors while the soft domains will. This provides nondestructive read-out of hard and soft domains.

After read-out, the domains 156 are propagated to other circuitry in the apparatus, or can be collapsed.

Other sensing elements than magnetoresistive sensing elements can be used. For instance, flux detection means such as conductor loops can be used to detect the oscillating domains. The choice is left to the designer to pick the type of sensor which would not be coupled to the magnetic drive field in a way which would swamp the detection of the magnetic bubble domain.

A representative spacing between sensing elements 154A and 154B is about 20 microns, while the magnitude of the current pulses in lines 152A and 152B is approximately 1 amp. Generally, a spacing of the order of 50 microns can be used between conductors 152A and 152B. Thus, the soft domains can be made to oscillate over a distance of approximately 10 microns for a 10 Oe. gradient drive field at 1 M cps., assuming a mobility of 200 cms/sec. Oe. The hard domain will hardly move at all and will tend to deflect sideways.

FIG. 13 shows an apparatus for detecting hard and soft bubble domains which utilizes the difference in radial response of these domains when an applied bias field is provided. An oscillating domain is coupled to a resonant circuit to change a property of a resonant circuit, which indicates the presence of either a hard or a soft domain. The structure utilized here is the same as that described in copending application Ser. No. 267,877, filed June 30, 1972, in the name of B. Argyle et al.

In more detail, either hard or soft domains are propagated in the direction of arrow 162 by a propagation means indicated generally by the T and I bars 164. A coil 166 is the drive circuit used to oscillate a domain 168 located within the coil area. The domain is centered in the coil by a small current pulse traveling through the coil which creates a gradient in magnetic field within the coil in order to attract the domain from propagation means 164 to the center of the coil. Of course, propagation means 164 can be used to move the domain into coil 166.

A bias field source 170 produces magnetic bias field $H_z$ while a propagation field source 172 produces reorienting in plane magnetic drive field H. These sources operate under control of pulses received from control means 174.

The sensing apparatus generally comprises the coil 166 which functions as an oscillation means for oscillating the size and shape of a domain 168. Further included in the sensing apparatus is circuitry, generally designated 176, which provides a tickling current I in loop 166 for oscillation of domain 168.

Circuitry 176 includes inductance L1, a capacitance C1, a current limiting impedance Z1, a dc voltage source $V_{DC}$ (which is optional) and an ac voltage source ($V_{AC}$) $V_{AC}$ may be triggered by a control pulse from control means 174, if desired. These two electrical sources provide current $I_s$ in loop 166. Inductance L1 is added to the circuitry in order to lower the resonant frequency of the circuit to more suitable values. Z1 is preferably an inductance so the tank circuit comprising L1 and C1 will not be loaded when a domain is oscillated in loop 166. Voltage source $V_{AC}$ provides rf voltages in frequencies generally in the range 1–100 megacycles. The frequency response of the domain depends upon the bubble domain material and the frequency of $V_{AC}$ is generally chosen to be a frequency to which the bubble domain diameter will respond efficiently (for example, near the resonant frequency of the normal bubble domain). Operation at as high a frequency as possible (at which the domain will respond) is preferable.

Source $V_{DC}$ is used to adjust the size of the domain 168 within loop 166 to be such that all of the stray magnetic field of the domain will couple to the loop even in the absence of AC current $I_\omega$. that is, when the domain diameter is about equal to the size of loop 166, maximum sensitivity results.

A detection means 178 is connected at terminal A and provides an indication of the presence and absence of domains in sense loop 166, by being responsive to the change in AC inductance of loop 166 when domains are present and absent in this loop. Actually, hard and soft domains will have different responses to the tickling current I and will produce different inductance changes. Consequently, these two types of domains will be sensed based on the difference in AC inductance which each produces.

The operation of the circuit of FIG. 13 is the same as that described in aforementioned copending application Ser. No. 267,877. A domain 168 located in loop 166 has its diameter expanded and contracted by AC current $I_\omega$ flowing through loop 166 due to applied voltage $V_{AC}$. $I_s = I_\omega + I_{DC}$, where $I_{DC}$ is the dc current due to $V_{DC}$. Since the domain 168 oscillates in diameter, the magnetic flux from the domain which couples sense loop 166 will oscillate in value. This will cause a change in ac inductance of loop 166 which will cause a frequency change in the associated circuitry 176. This frequency change is detected by detection means 178, indicating that a domain 168 is present in sense loop 166. As mentioned previously, hard and soft domains will provide different inductance changes and detection means 178 will indicate what type of domain is in loop 166.

The advantage of the embodiment shown in FIGS. 12 and 13 is that nondestructive read-out is provided for the direct detection of hard and soft domains. It is important to note that the presence of low radial mobility for the harder domains does not necessarily imply large propagation time, if sideways deflection is prevented.

SUMMARY

What has been described is a new magnetic bubble domain system utilizing different types of magnetic domains. In contrast with prior art systems where information was represented by the presence and absence of domains, the present system uses bubble domains having different properties. These properties vary depending upon the number of vertical Bloch lines in the domain such that domains having different numbers of vertical Bloch lines can be used to provide information. Of course, systems can be designed using bubbles having a finite number of vertical Bloch lines together with bubbles having no vertical Bloch lines. Still further, various combinations of vertical Bloch lines can be used to provide a full range of information-bearing bubbles. Since the collapse field for a domain will vary depending upon the number of vertical Bloch lines in the domain, as illustrated by FIG. 4, it is possible to utilize domains having large numbers of vertical Bloch lines which collapse at field H1, domains having a lesser number of vertical Bloch lines which collapse at field H2, (H2 < H1) and domains having very few or no vertical Bloch lines which collapse at field H3 (H3 < H2). Thus, an entire spectrum of values can be obtained and useful systems can be designed with these.

Additionally, the difference in mobility for domains having different numbers of Bloch lines can be utilized to provide structures for performing numerous functions. As another means for detection, polarized light can be directed to the magnetic sheet containing the domains. When viewed through an analyzer, the hard domains will appear larger in diameter than the soft domains. An optical apparatus for providing the polarized light is shown in copending application Ser. No. 158,494, filed June 30, 1971 now U.S. Pat. No. 3,815,107. Since bubble domain properties are quantified depending upon the number of vertical Bloch lines in the system, direct design of systems using multilevels of information is possible. System design using information having various levels is well within the skill of logicians and other scientists and engineers working with coding theory and system design.

When working with domains having three informational states, for example, read-out is conveniently obtained by using the apparatus of FIG. 12 or FIG. 13. In the case of FIG. 12, different displacements will occur for bubbles having differing numbers of vertical Bloch lines. Consequently, a plurality of sensors is provided and the number of sensors activated by an oscillating domain will depend on the amplitude of its oscillation. A soft domain will be detected by all sensors, while an intermediate sensor will be detected by one pair of sensors, and a hard domain will not be detected by any sensor. For the embodiment of FIG. 13, the different types of domains will produce different selfinductance changes which can be detected by means 176.

Additionally, the input bubble stream can be counted and sent to a first coil which produces the field H3 to collapse the very soft bubbles. The number of bubbles remaining is counted and sent to another discriminator which produces a field H2 necessary to collapse the second level of bubbles. The next stage is a sensing device which detects and counts only the very hard bubbles still left. Since it was known how many intermediate and hard bubbles were present at the second discrimination stage, a count can be obtained for the number of intermediate domains and the number of very soft domains can then be determined. Of course, other possibilities exist which are well within the skill of a person working in this art.

What is claimed is:

1. A magnetic information handling system using different types of magnetic bubble domains for representation of information, comprising:

a single layer of magnetic medium in which multi-state magnetic bubble domains can exist at the same time, said domains having different numbers of vertical Bloch lines in their domain walls, said information being represented by said multi-state domains and in particular by the number of vertical Bloch lines in said domains, storage means for simultaneously storing domains having different numbers of vertical Bloch lines in said magnetic medium, write means for producing information in said magnetic medium, said information being in the form of coded patterns of said multi-state domains, said write means including means for producing magnetic domains having different numbers of said vertical Bloch lines in their domain walls and further means for entering a pattern of coded information into said storage means, read means for reading said information contained in said storage means, said read means including further means for detecting the information state of said magnetic domains in accordance with the number of vertical Bloch lines in the walls of said domains.

2. The information system of claim 1, where said read means includes means for collapsing domains having different information states.

3. The information system of claim 2, where said read means includes means for oscillating said multi-state domains, and further means responsive to said oscillating domains for indicating the information state of said domains.

4. The system of claim 1, where said write means includes means for separating multi-state domains from one another in said magnetic medium in accordance with the number of vertical Bloch lines in the domain walls of said multi-state domains.

5. The information system of claim 1, including means for selectively removing from said storage means magnetic domains having different numbers of vertical Bloch lines.

6. An information system using magnetic bubble domains having different properties for storage of information in accordance with said properties, comprising:

a single magnetic medium in which said domains having different properties can simultaneously exist, write means for producing domains having different properties in said magnetic medium, said domains being characterized by different behavior in a magnetic field applied substantially parallel to an easy direction of magnetization is said magnetic medium, said domains being representative of different informatiom states in accordance with their behavior in said applied magnetic field, storage means for separately storing domains having said different behavior in said applied magnetic field, said storage means having a plurality of domain storage positions all of which are occupied by said domains having different properties, read means for detecting said information where said read means includes first means for applying said magnetic field and second means for detecting the behavior of said domains in response to said applied magnetic field for determination of said information state of said domains, and means for propagating bubble domains having different behavior in said applied magnetic field in said magnetic medium.

7. The information system of claim 6, where said read means includes means for separating domains having different behavior in said applied magnetic field, in accordance with said different behavior.

8. An information handling apparatus using magnetic bubble domains, comprising:

a single layer of magnetic material in which bubble domains having different mobilities can exist simultaneously, said domains representing different information states depending upon their mobilities in said magnetic medium, write means for writing different information states in said magnetic medium, said write means including means for selectively producing magnetic domains having different mobilities, storage means for storing domains having different information states at the same time and including said domains therein, read means for reading information in said storage means where said read means includes means for detection of said domains in accordance with their mobilities in said magnetic medium.

9. The information system of claim 8, including oscillation means for applying an oscillating magnetic field along a direction defined by an easy axis of magnetization of said medium.

10. The information system of claim 8, including means for separately storing in said magnetic medium domains having different mobility.

11. An information handling system using magnetic domains which are characterized by a domain wall in which the wall magnetization can have two possible directions, the transition region between two magnetization regions of said two directions being a Bloch line where said wall magnetization is substantially normal to the plane of said wall, comprising:

a single layer of magnetic material in which said domains can exist, including domains having Bloch lines which extend substantially the full height of said domains, called vertical Bloch lines, write means for producing information in the form of said magnetic domains, said write means including further means for coding information in terms of the number of said vertical Bloch lines in said domains for entry into storage, storage means for simultaneously storing magnetic domains having different numbers of said vertical Bloch lines, said storage means having a plurality of domain storage positions all of which are filled by domains having different numbers of vertical Bloch lines, read means responsive to the number of said vertical Bloch lines in said domains for determining the information state of said coded information.

12. The information system of claim 11, including propagation means for moving said coded information in said magnetic layer.

13. The information system of claim 11, further including sorting means for separating domains having different numbers of said vertical Bloch lines.

14. The system of claim 11, where said write means includes means for producing a localized magnetic field substantially along a direction defined by an easy direction of magnetization of said magnetic medium.

* * * * *

UNITED STATES PATENT AND TRADEMARK OFFICE
CERTIFICATE OF CORRECTION

PATENT NO. : 3,899,779

DATED : Aug. 12, 1975

INVENTOR(S) : Alexis Plato Malozemoff

It is certified that error appears in the above-identified patent and that said Letters Patent are hereby corrected as shown below:

Column 1, line 16, change "Block" to --Bloch--;
line 61, change "Block" to --Bloch--;
line 61, change "throught" to --thought--;
line 64, change "well" to --wall--;
line 67, change "bloch" to --Bloch--.
Column 2, line 52, change "in" to --In--.
Column 4, line 12, change "on" first occurrence to --of--;
line 19, change "movement" to --moment--;
line 43, change "$H_2$" to --$H_z$--;
line 64, change "Block" to --Bloch--.
Column 6, lines 36 & 37, change "number" to --numbers--;
line 38, change "an" to --and--.
Column 7, line 27, change "comains" to --domains--.
Column 8, line 54, change "resonable" to --reasonable--.
Column 10, line 28, change "these" to --those--;
line 48, after "write" insert --means--.
Column 13, line 23, change "replacere" to --replacer--.
Column 15, line 61, change "I" to --$I_\omega$--;
line 66, change "$source_{VAC}$)" to --source $V_{AC}$.--
Column 16, line 27, change "current I" to --current $I_\omega$--.
Column 18, line 44, change "is" to --in--.

Signed and Sealed this

*twenty-seventh* Day of *January 1976*

[SEAL]

*Attest:*

RUTH C. MASON
*Attesting Officer*

C. MARSHALL DANN
*Commissioner of Patents and Trademarks*